US010041325B2

(12) United States Patent
McGruddy et al.

(10) Patent No.: US 10,041,325 B2
(45) Date of Patent: Aug. 7, 2018

(54) HIGH PRESSURE SEAL WITH COMPOSITE ANTI-EXTRUSION MECHANISM

(71) Applicant: Utex Industries, Inc., Houston, TX (US)

(72) Inventors: Luke McGruddy, North Tyneside (GB); Gary Burton, Morpeth (GB); Albert Duhrin, Marden Estate (GB)

(73) Assignee: Utex Industries, Inc., Houston, TX (US)

( * ) Notice: Subject to any disclaimer, the term of this patent is extended or adjusted under 35 U.S.C. 154(b) by 476 days.

(21) Appl. No.: 14/813,588

(22) Filed: Jul. 30, 2015

(65) Prior Publication Data

US 2016/0032681 A1 Feb. 4, 2016

Related U.S. Application Data

(60) Provisional application No. 62/032,094, filed on Aug. 1, 2014.

(51) Int. Cl.
| | |
|---|---|
| *F16J 15/02* | (2006.01) |
| *E21B 33/12* | (2006.01) |
| *E21B 33/00* | (2006.01) |
| *F16J 15/16* | (2006.01) |

(52) U.S. Cl.
CPC .... *E21B 33/1216* (2013.01); *E21B 2033/005* (2013.01); *F16J 15/166* (2013.01)

(58) Field of Classification Search
CPC ................................ F16J 15/02; F16J 15/166
See application file for complete search history.

(56) References Cited

U.S. PATENT DOCUMENTS

| | | | |
|---|---|---|---|
| 4,379,558 A | * | 4/1983 | Pippert ............... E21B 33/1216 277/536 |
| 4,576,386 A | | 3/1986 | Benson et al. |
| 4,809,989 A | | 3/1989 | Kernal |

(Continued)

OTHER PUBLICATIONS

Dow Automotive Systems, "Specialty Adhesives Rubber-to-Metal Bonding Agents Technical Guide Review of Application" http://msdssearch.dow.com/PublishedLiteratureDOWCOM/dh_08b2/0901b803808b2ba5.pdf?filepath=automotive/pdfs/noreg/299-52039.pdf&fromPage=GetDoc. accessed Jul. 30, 2015, 5 pages.

(Continued)

*Primary Examiner* — Vishal A Patel
(74) *Attorney, Agent, or Firm* — Haynes and Boone, LLP

(57) ABSTRACT

A high pressure closed gland unitized seal assembly for sealing against a connector pin in a box and pin seal used in a sub-sea riser joint assembly. The high pressure closed gland unitized seal assembly includes an elastomeric seal body having an inner diameter end and an outer diameter end formed of an elastomeric material having a first modulus of elasticity. The inner diameter end of the seal body includes two diametrically opposed axially outward base portions and an axially inward sealing portion. Integrated with the elastomeric material at the base portions of the inner diameter end of the seal body are a pair of diametrically opposed anti-extrusion rings having a modulus of elasticity that is higher than the modulus of elasticity of the elastomeric material so as to prevent the extrusion of the elastomeric seal body. The anti-extrusion rings are disposed between the elastomeric seal body and tightly wound coil springs.

20 Claims, 4 Drawing Sheets

(56) References Cited

U.S. PATENT DOCUMENTS

| | | | | |
|---|---|---|---|---|
| 5,014,603 A | * | 5/1991 | Navarette | F15B 15/1433 |
| | | | | 188/381 |
| 5,180,008 A | * | 1/1993 | Aldridge | E21B 33/03 |
| | | | | 166/84.1 |
| 5,603,511 A | * | 2/1997 | Keyser, Jr. | E21B 33/1216 |
| | | | | 277/337 |
| 5,791,657 A | * | 8/1998 | Cain | E21B 33/03 |
| | | | | 277/322 |
| 6,173,964 B1 | | 1/2001 | Bell et al. | |
| 8,201,832 B2 | | 6/2012 | Kocurek | |
| 8,623,169 B2 | | 1/2014 | Delfino et al. | |
| 2003/0230855 A1 | | 12/2003 | Malone et al. | |
| 2011/0266752 A1 | * | 11/2011 | Kocurek | F16J 15/024 |
| | | | | 277/322 |
| 2011/0283880 A1 | * | 11/2011 | Okuma | F16J 15/3284 |
| | | | | 92/165 R |
| 2013/0043657 A1 | | 2/2013 | Carringer | |
| 2013/0292138 A1 | | 11/2013 | Givens et al. | |
| 2014/0053602 A1 | | 2/2014 | Catheline et al. | |
| 2014/0200108 A1 | | 7/2014 | Duke et al. | |

OTHER PUBLICATIONS

Dupont, "Teflon® PTFE Fluoropolymer Resin" Properties Handbook, Jul. 1996, 38 pages.
International Search Report and Written Opinion dated Feb. 2, 2016 in connection with PCT Application No. PCT/US2015/042835; 9 pp.

\* cited by examiner

HIGH PRESSURE SEAL WITH COMPOSITE ANTI-EXTRUSION MECHANISM

PRIORITY

The present disclosure claims the benefit of the filing date of U.S. Provisional Patent Application 62/032,094, filed Aug. 1, 2014, incorporated herein in its entirety by reference.

BACKGROUND

The present invention generally relates to high pressure seals and in particular to a high pressure seal used in subsea drilling riser systems.

Sub-sea riser systems are commonly designed as a series of drawn steel pipes joined together by a pin and box arrangement at each end to form a "string". The riser string joints are screwed together and each joint has an internal rubber seal between the pin and box in a specially machined housing. The purpose of the seal is to prevent the loss of the pressurized fluids transported through the string from the well head to the surface, and in the event of a loss of internal pressure within the string, to keep seawater from entering the string.

There are several designs of seal system and commonly this has been a molded rubber D section with embedded tightly coiled wire known as a garter spring on either side of the seal to prevent extrusion of the rubber from its housing under the pressure of the well fluid. These seals are commonly called S-seals in the industry. Current technology has the capability of the seal to withstand extrusion up to 15,000 psi operating pressure and 22,500 psi test pressure. This capability is maintained over a temperature range of −18° C. to 121° C. Pressures and temperatures exceeding these limits cause the rubber to extrude past the spring resulting in a leak or blowout.

Glands housing these seals are known as "closed glands" which means that a seal must be compressed and contorted or stretched into the gland. An "open gland" seal is able to slide into position and then axially retained without the need for contortion or stretching. Open gland assemblies can generally withstand higher pressures because anti-extrusion rings, sometimes referred to as back-up rings, can be made from rigid material without the need for a split or break. Conventional closed gland sealing arrangements require anti-extrusion material to be elastic enough to bend and stretch or require a split in a ring creating a path for extrusion. They are typically multi-piece designs making assembly complicated.

Deeper water systems now require the riser string to operate at 20,000 psi and be capable of test at 30,000 psi, with a temperature profile of −29° C. to 150° C. using a closed gland. There is currently no corresponding unitized riser seal capable of withstanding this pressure and temperature in the application.

SUMMARY

According to an exemplary aspect, the present disclosure is directed to a sealing assembly that may include a generally D-shaped seal body having an inner diameter end and an outer diameter end formed of an elastomeric material having a first modulus of elasticity. The inner diameter end of the seal body may include base portions formed at outer edges and may include an inwardly facing seal interface disposed between the base portions. The sealing assembly may also include first and second diametrically opposed axially outward anti-extrusion rings having a second modulus of elasticity and being bonded to the base portions of the seal body. The second modulus of elasticity may be higher than the first modulus of elasticity. The sealing assembly may also include first and second coil springs, and the first and second diametrically opposed axially outward anti-extrusion rings may be disposed between axially outward base portions and the first and second coil springs, respectively. The anti-extrusion rings may be structured to prevent axial extrusion of the diametrically opposed axially outward base portions of the inner diameter end of the seal body. The axially inward seal portion of the seal body may be free to expand radially.

In an aspect, the seal body comprises an elastomeric material selected from the group consisting of hydrogenated nitrile butadiene rubber (HNBR), nitrile butadiene rubber (NBR), perfluoro-elastomers (FFKM), tetrafluoro ethylene/propylene copolymer rubbers (FEPM), fluoro-elastomers (FKM), neoprene and natural rubber. In an aspect, the first and second diametrically opposed axially outward anti-extrusion rings comprise polytetrefluoroethylene (PTFE).

According to an exemplary aspect, the present disclosure is directed to a sealing assembly for sealing against a surface. The sealing assembly may include a generally D-shaped seal body having an inner diameter and an outer diameter. One of the inner and the outer diameters may have a curved seal surface when in a natural state and may be configured to interface with and seal against the surface. The seal body may comprise cutouts at corner edges on each side of the curved seal surface. The seal body may have a first modulus of elasticity. First and second diametrically opposed axially outward anti-extrusion rings may be disposed in the cutouts and may have a second modulus of elasticity that is higher than the first modulus of elasticity. First and second coil springs may be disposed within the anti-extrusion rings.

In an aspect, the first and second anti-extrusion rings each include a groove formed therein, the first and second coil springs being disposed within the respective groove in the first and second anti-extrusion rings. In an aspect, the depth of the groove is substantially the same as the diameter of the coil ring. In an aspect, the curved seal surface is on the inner diameter of the seal body and protrudes inwardly to have an inner diameter smaller than an inner diameter of the anti-extrusion rings. In an aspect, the curved seal surface is on the outer diameter of the seal body and protrudes outwardly to have an outer diameter greater than an outer diameter of the anti-extrusion rings. In an aspect, the cutouts comprise shoulder edges that respectively taper outwardly toward outer edges of the seal body. In an aspect, the cutouts comprise shoulder edges that taper inwardly toward an outer edge of the seal body. In an aspect, the anti-extrusion rings are in the shape of a hollow frustum. In an aspect, a bottom of the frustum is flush with a side edge of the seal body. In an aspect, a top of the frustum abuts a first shoulder of the cutout. In an aspect, a taper of the frustum abuts a second shoulder of the cutout. In an aspect, the seal body comprises an elastomeric material selected from the group consisting of hydrogenated nitrile butadiene rubber (HNBR), nitrile butadiene rubber (NBR), perfluoro-elastomers (FFKM), tetrafluoro ethylene/propylene copolymer rubbers (FEPM), fluoro-elastomers (FKM), neoprene and natural rubber. In an aspect, the first and second diametrically opposed axially outward anti-extrusion rings comprise polytetrefluoroethylene (PTFE).

According to an exemplary aspect, the present disclosure is directed to a sealing assembly for sealing a connector pin stabbed in a connector box. The sealing assembly may include a generally D-shaped seal body arranged to be carried by one of the connector box and the connector pin. The seal body may have an inner diameter and an outer diameter, and one of the inner and the outer diameter may have a curved seal surface when in a natural state and configured to interface with and seal against the other of the connector box and the connector pin. The seal body may include a first cutout and a second cutout formed on opposing sides of the curved seal surface. The seal body may have a first modulus of elasticity. First and second anti-extrusion rings may be disposed respectively in the first and second cutouts. The first and second anti-extrusion rings may have a second modulus of elasticity higher than the first modulus of elasticity. The first and second anti-extrusion rings may each having a groove formed therein arranged to face toward the other of the connector box and the connector pin. First and second coil springs may be respectively disposed within the first and second grooves.

In an aspect, the seal body comprises an elastomeric material selected from the group consisting of hydrogenated nitrile butadiene rubber (HNBR), nitrile butadiene rubber (NBR), perfluoro-elastomers (FFKM), tetrafluoro ethylene/propylene copolymer rubbers (FEPM), fluoro-elastomers (FKM), neoprene and natural rubber. In an aspect, the first and second diametrically opposed axially outward anti-extrusion rings comprise polytetrefluoroethylene (PTFE). In an aspect, the anti-extrusion rings are in the shape of a hollow frustum.

DETAILED DESCRIPTION

According to several exemplary embodiments, a closed gland unitized seal, such as a high pressure unitized seal is provided in which resistance to extrusion is enhanced by the inclusion of opposed axially-outward anti-extrusion rings bonded to axially outward base portions on each side of an elastomeric seal body. According to several exemplary embodiments, the anti-extrusion rings are made of polytetrafluoroethylene (PTFE) or another material having similar properties such as tensile modulus, extrusion resistance, modulus of elasticity and resiliency. The inclusion of the anti-extrusion rings prevents the elastomeric material of the elastomeric seal body from being forced through the structure of an underlying spring in order to achieve the increased pressure requirements, but still remains flexible as a single piece seal for ease of assembly with a pin and box joint. According to several exemplary embodiments, the elastomeric body of the high pressure unitized seal and the spring can be contorted or stretched into a gland, but a continuous PTFE ring in a stand-alone condition could not be installed without permanent yielding. According to several exemplary embodiments, the high pressure seal includes opposed axially-outward PTFE anti-extrusion rings in a unitized molded position adjacent to the spring and bonded to axially outward base portions on each side of the elastomeric seal body so that the PTFE is forced back into its original shape after installation.

According to several exemplary embodiments, the closed gland unitized seal, such as a high pressure unitized seal, maintains a seal up to pressures of 30,000 psi for a duration of 24 hours with no extrusion of the elastomeric body from a test seal housing. The opposed axially-outward anti-extrusion rings bonded to axially-outward base portions on each side of the elastomeric seal body make it possible to prevent extrusion through the spring, while still maintaining a unitized seal for simple assembly. According to several exemplary embodiments, the anti-extrusion rings are made of PTFE because of its favorable properties of inertness and heat resistance. Special processing is required to position the PTFE integrally within the high pressure unitized seal to keep it adjacent to the spring and to have a good bond to the elastomeric body. Specifically, the anti-extrusion rings are prepared for bonding to the elastomeric body of the seal by a chemical surface treatment and the application of a heat activated bonding agent well known to those of ordinary skill in the art such as a phenolic resin-based general purpose adhesive. The composite seal is produced by a single stage molding operation that combines the spring elements, anti-extrusion rings and elastomeric material into their relative positions by accurate control of the location of each element into the mold tool prior to the application of heat and pressure.

Figure 1:
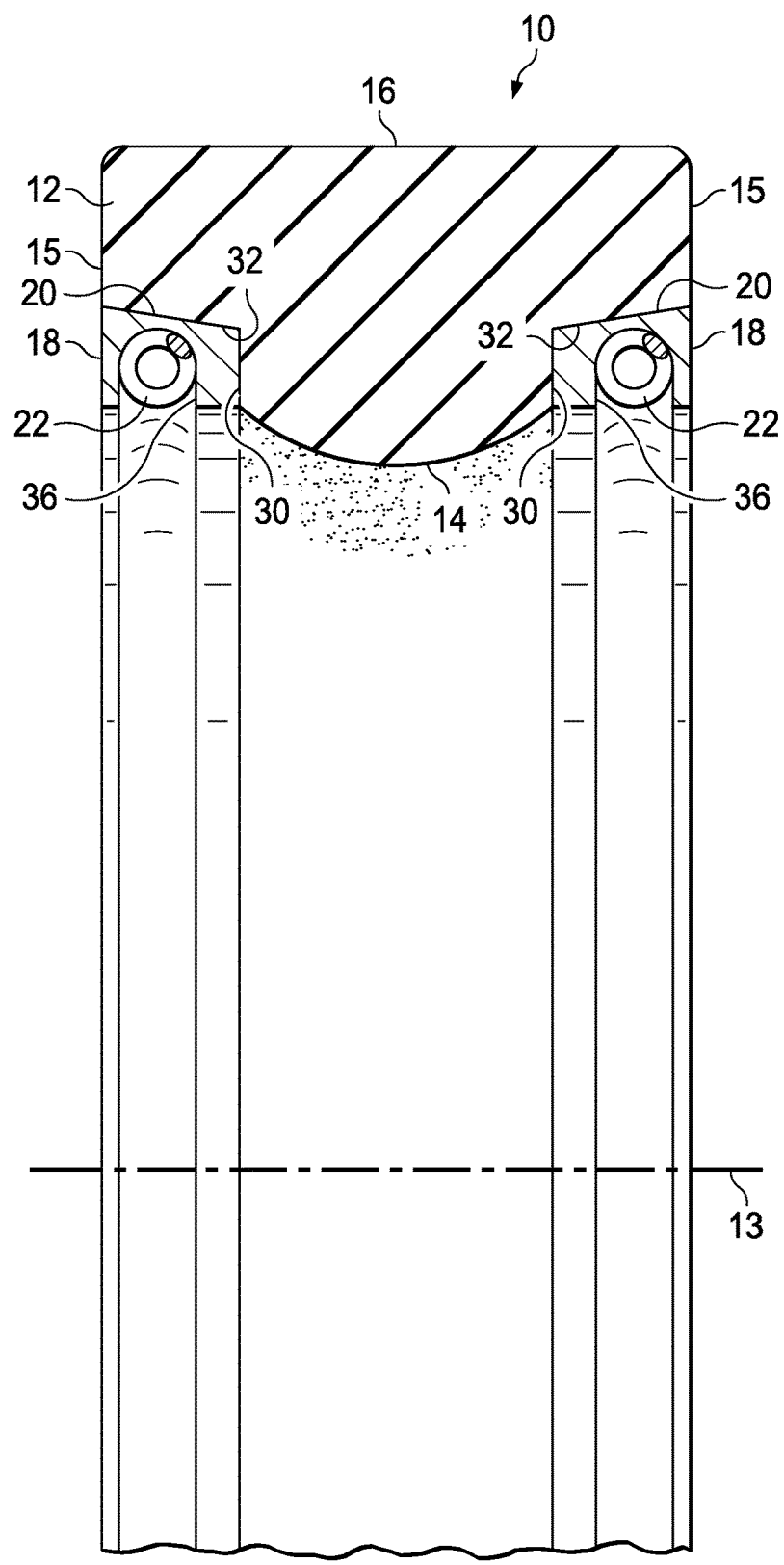
FIG. 1 is a cross-sectional view of a high pressure seal assembly.
Figure 2:
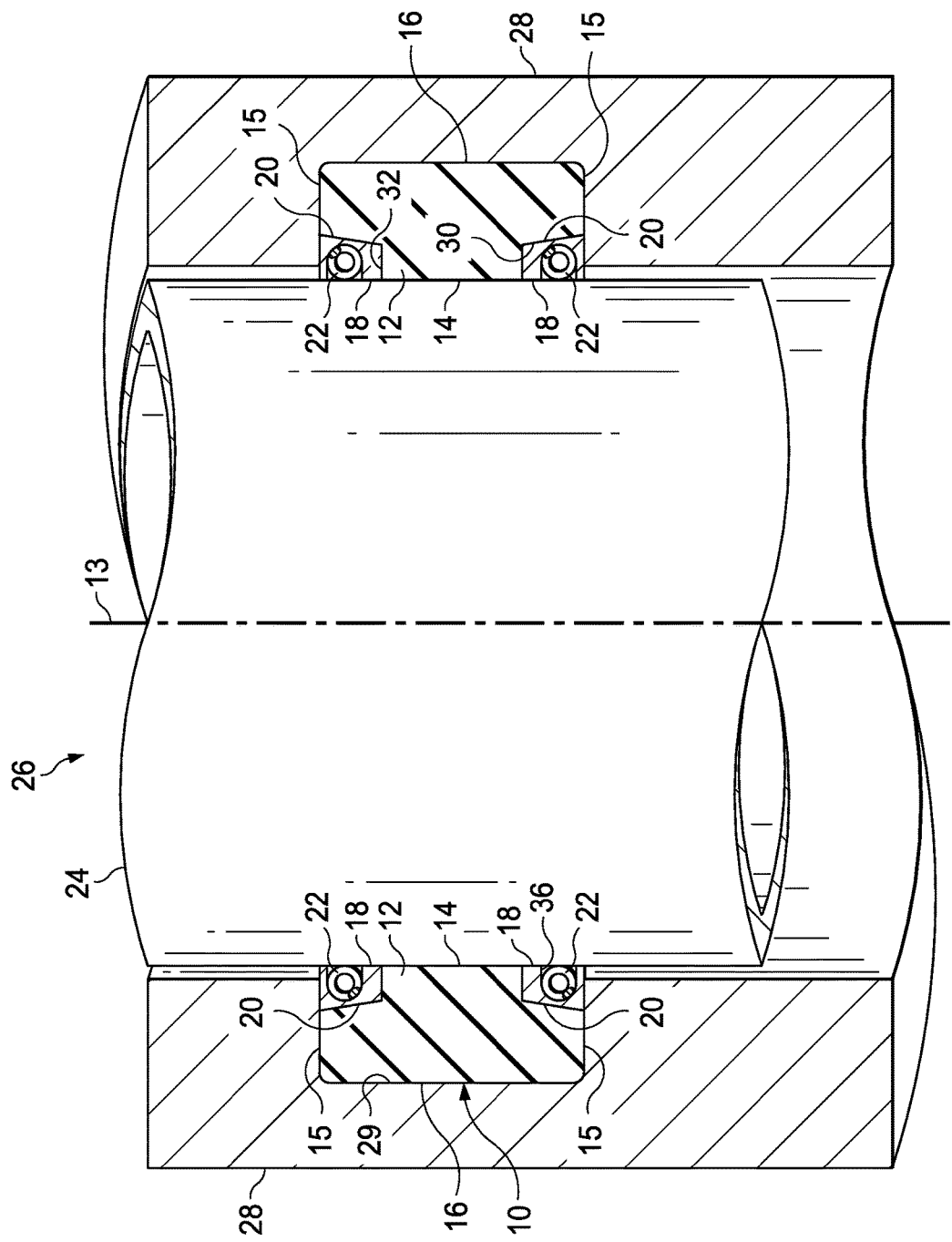
FIG. 2 is a cross-sectional view of a sub-sea riser system which utilizes a closed gland unitized seal as shown in FIG. 1.

Referring initially to FIGS. 1 and 2, a D-shaped high pressure unitized sealing ring 10 is shown which comprises an elastomeric body 12 having a body axis 13, an inner diameter side 14, side edges 15, and an outer diameter side 16 for sealing against a connector pin 24 in a conventional box and pin seal used in sub-sea riser joint assembly 26. The elastomeric body 12 includes base portions 20 formed at corner edges of the inner diameter side 14 and the side edges 15. The base portions 20 in this embodiment include transverse shoulder edges 30 extending substantially transverse relative to the body axis 13 and include longitudinal shoulder edges 32 extending in the direction of the body axis 13. Together, the transverse shoulder edge 30 and the longitudinal shoulder edge 32 form a step along the inner diameter of the body 12 at the corner edges. Between the base portions 20, the D-shape inner surface curves from one base portion 20 to the other base portion 20 when the sealing ring 10 is in an uncompressed or natural condition. In this exemplary embodiment, the longitudinal shoulder edge 32 is oblique relative to the body axis 13 and tapers toward a side edge 15 of the body 12 from an intersection with the transverse shoulder edge 30. Accordingly, each base portion 20 has an inwardly facing surface that tapers outwardly to the side edges 15 of the body 12. In other embodiments however, the longitudinal shoulder edge 32 is parallel to the body axis 13.

The D-shaped high pressure unitized sealing ring 10 also includes axially outward and diametrically opposed anti-extrusion rings 18. In some embodiments, these are integrally molded to the axially outward base portions 20 of the elastomeric body 12. Accordingly, in the exemplary embodiment shown, each of the anti-extrusion rings 18 forms a hollow frustum. The bottom of the frustum is disposed to be flush with the outer side edge 15 of the body 12. The top of the frustum is disposed in contact with the transverse shoulder edge 30. The anti-extrusion rings 18 each include a groove 36 formed therein. Here, the groove opening faces in a direction transverse to the body axis 13. Disposed at least partially within the groove 36 of the anti-extrusion rings are coil springs 22. In some embodiments, these are tightly wound coil springs 22, and in some embodiments, are formed of stainless steel. However, other materials and spring arrangements are contemplated. The coil springs 22 may be sized to fit within the groove 36 so that a perimeter edge is about flush with the inwardly facing surface of the anti-extrusion rings. Accordingly, the depth of the groove 36 may be about equal to the diameter of the coil spring.

According to several exemplary embodiments, the elastomeric body 12 of the high pressure unitized seal 10 includes one or more elastomeric materials such as hydrogenated nitrile butadiene rubber ("HNBR"), nitrile butadiene rubber ("NBR"), perfluoro-elastomers ("FFKM"), tetrafluoro ethylene/propylene copolymer rubbers ("FEPM"), fluoro-elastomers ("FKM"), neoprene and natural rubber.

According to several exemplary embodiments, the integrally molded axially outward and diametrically opposed anti-extrusion rings 18 have good bonding strength to the axially outward base portions 20 of the elastomeric body 12. According to several exemplary embodiments, the integrally molded anti-extrusion rings 18 are made from a material having a higher modulus of elasticity than the elastomeric material of the elastomeric body 12 to prevent pressure from extruding the elastomeric material of the elastomeric body 12 through the coil springs 22. Accordingly, in use, the D-shape inner diameter may compress and deform more easily than the anti-extrusion ring 18. As such, the edges where the anti-extrusion rings 18 are located are reinforced. Those of ordinary skill in the art will recognize that the thickness of the anti-extrusion rings 18 needed to restrict extrusion of the anti-extrusion rings 18 is related to the modulus of elasticity of the material forming the anti-extrusion rings 18, the modulus of elasticity of the elastomeric body 12, the diameter of the seal 10, and the proportions of the elastomeric body 12.

As shown in FIG. 2, according to several exemplary embodiments, a sub-sea riser joint assembly 26 includes a connector pin 24 that stabs a connector box 28 to create a string capable of transporting pressurized fluid. The seal ring 10 is disposed within a groove 29 in the connector box 28 and, the D-shape inner diameter of the seal ring 10 is disposed against and sealingly engaged with the connector pin 24. Accordingly, the seal ring 10 provides an area for sealing material to restrict fluid passage between the interior and exterior of the string.

Figure 3:
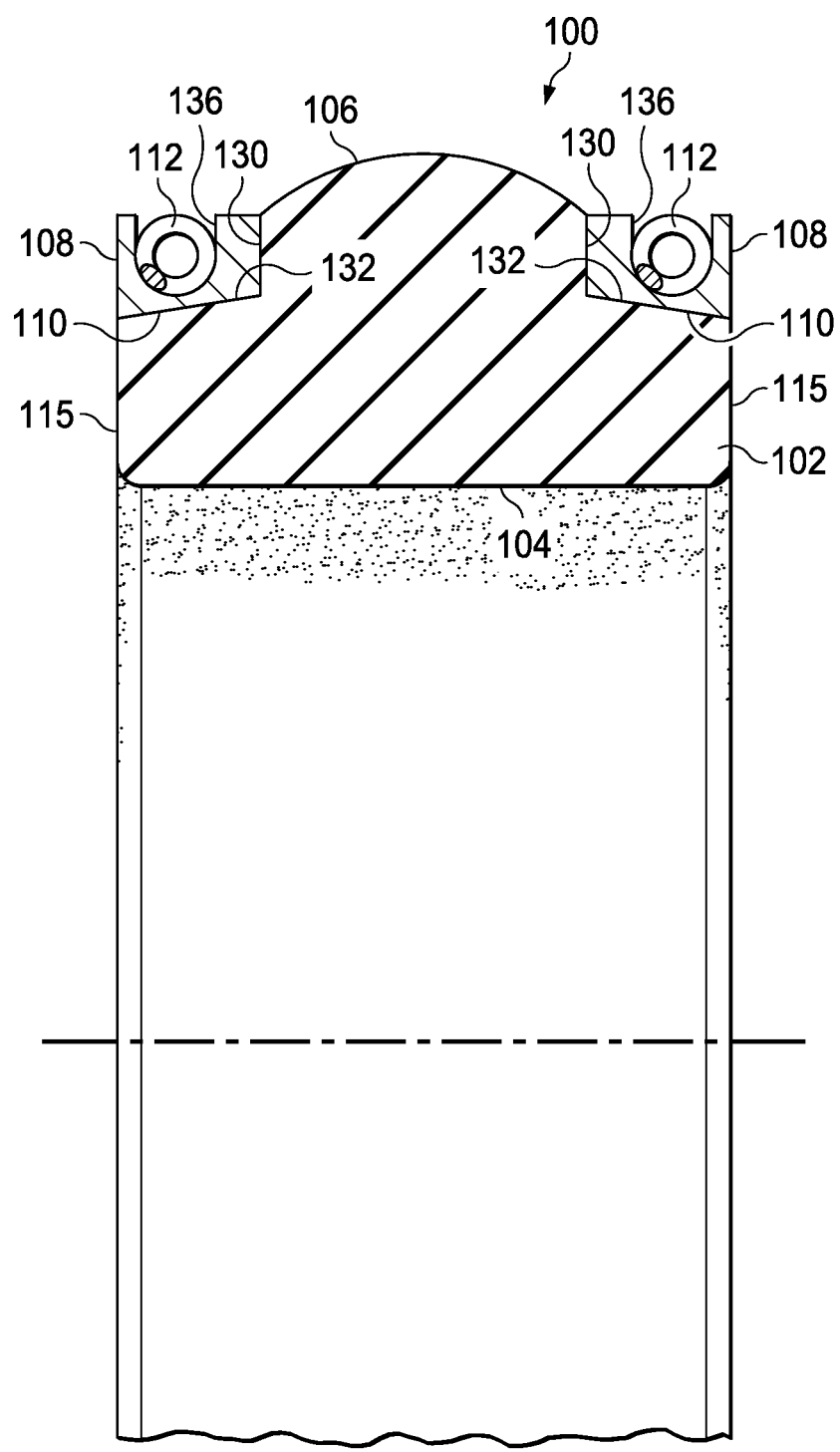
FIG. 3 is a cross-sectional view of a high pressure seal assembly in an inverted position relative to the high pressure seal assembly shown in FIG. 1.
Figure 4:
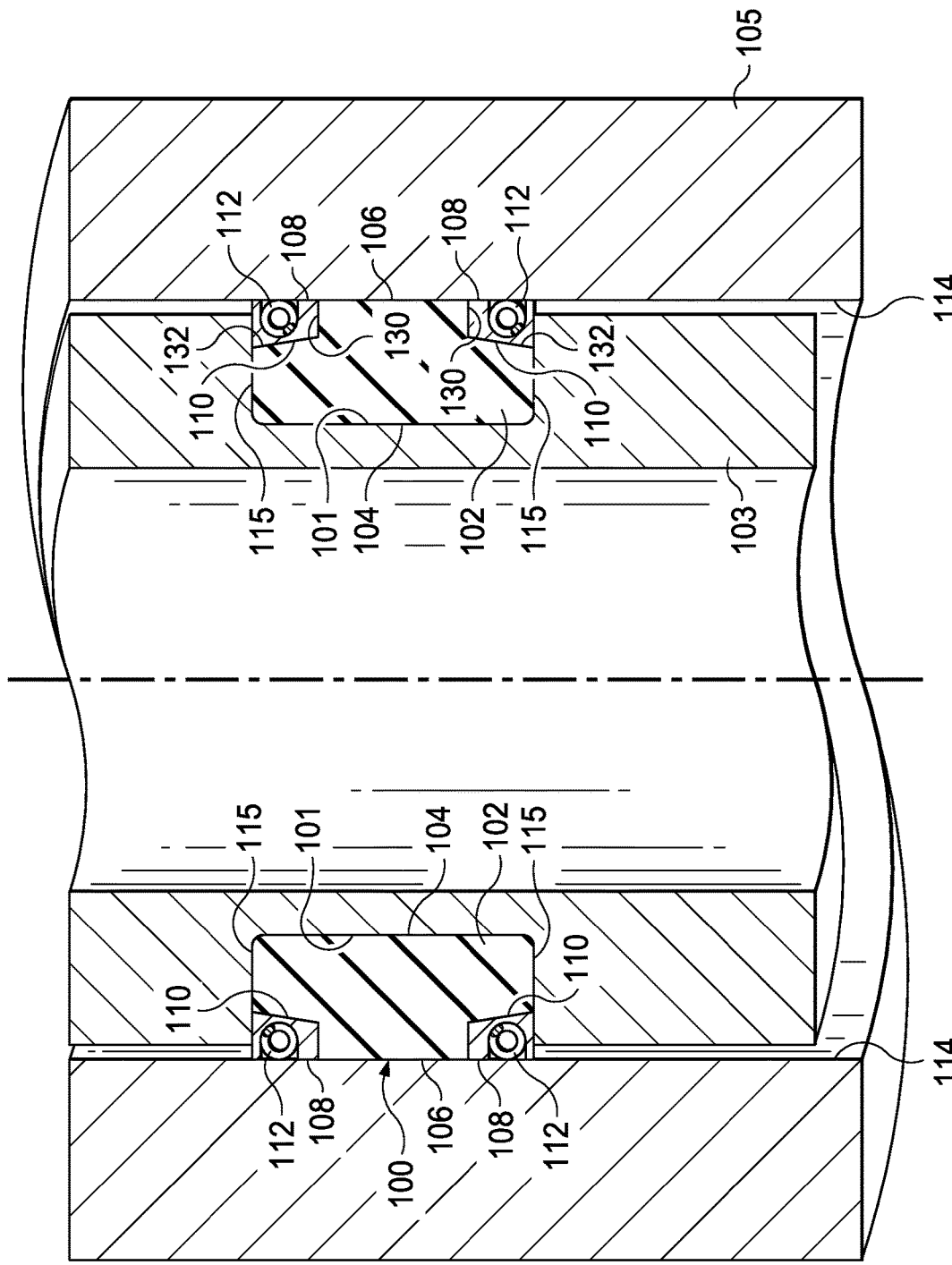
FIG. 4 is a cross-sectional view of a sub-sea riser system which utilizes a closed gland unitized seal as shown in FIG. 3.

As shown in FIGS. 3 and 4, a D-shaped high pressure unitized sealing ring 100 is inverted relative to the D-shaped high pressure unitized sealing ring 10 of FIG. 1. In FIG. 4, the sealing ring 100 is stretched into a notch 101 on a shaft, such as the connector pin 103, rather than compressed and contorted into position in the groove 29 machined within a bore as in FIG. 2. As shown in FIG. 3, the D-shaped high pressure unitized sealing ring 100 has an elastomeric body 102 having an inner diameter side 104, and an outer diameter side 106. The D-shaped high pressure unitized sealing ring 100 also includes axially outward and diametrically opposed anti-extrusion rings 108 which are integrally molded to axially outward base portions 110 of the elastomeric body 102, the anti-extrusion rings 108 being disposed between the elastomeric body 102 and tightly wound coil springs 112. The outer diameter side 106 creates a seal with a mating bore 114, such as the inner diameter of a connector box 105. The sealing ring 100 includes many features that are similar to those of the sealing ring 10 disclosed herein. For example and without limitation, the base portions 110 may each include a transverse shoulder edge 130 and a longitudinal shoulder edge 132; the anti-extrusion rings 108 may each include a groove 136; the body 102 may include side edges 112. Here the anti-extrusion rings 108 have a conical inner surface that engage against the longitudinal inner shoulder edges 132. Other similarities between the sealing ring 10 and the sealing ring 110 are also apparent, and it should be understood that the description of components with reference to FIGS. 1 and 2 may be equally applicable to the components in the embodiment of FIGS. 3 and 4.

As can be readily seen from the foregoing, principles of the present invention provide a D-shaped high pressure unitized sealing ring that includes anti-extrusion rings having a high modulus of elasticity integrated with an elastomeric seal to restrict extrusion of the elastomeric seal.

The foregoing detailed description is to be clearly understood as being given by way of illustration and example only, the spirit and scope of the present invention being limited solely by the appended claims.

What is claimed is:

1. A sealing assembly comprising:
   a generally D-shaped seal body having an inner diameter end and an outer diameter end formed of an elastomeric material having a first modulus of elasticity, the seal body defining a body axis, wherein the inner diameter end of the seal body includes a first notch and a second notch formed respectively at a first outer edge and a second outer edge, each of the first notch and the second notch being formed of a flat shoulder edge that extends in a direction of the body axis and a flat shoulder edge that extends transversely relative to the body axis, the flat shoulder edges intersecting at an obtuse internal angle, the inner diameter end including an inwardly facing seal interface disposed between the first notch and the second notch;
   first and second diametrically opposed axially outward anti-extrusion rings having a second modulus of elasticity and being bonded into the first and second notches respectively of the seal body, the second modulus of elasticity being higher than the first modulus of elasticity; and
   first and second coil springs;
   wherein the first and second diametrically opposed axially outward anti-extrusion rings are disposed between radially inwardly facing surfaces of the first and second notches and the first and second coil springs, respectively; and
   wherein the anti-extrusion rings are structured to prevent axial extrusion of axially outward portions of the inner diameter end of the seal body; and
   wherein the axially inward seal portion of the seal body is free to expand radially.

2. The sealing assembly of claim 1, wherein the seal body comprises an elastomeric material selected from the group consisting of hydrogenated nitrile butadiene rubber (HNBR), nitrile butadiene rubber (NBR), perfluoro-elastomers (FFKM), tetrafluoro ethylene/propylene copolymer rubbers (FEPM), fluoro-elastomers (FKM), neoprene and natural rubber.

3. The sealing assembly of claim 1, wherein the first and second diametrically opposed axially outward anti-extrusion rings comprise polytetrefluoroethylene (PTFE).

4. A sealing assembly for sealing against a surface comprising:

a generally D-shaped seal body having an inner diameter and an outer diameter defining a body axis, one of the inner and the outer diameters having a curved seal surface when in a natural state and configured to interface with and seal against the surface, the seal body comprising cutouts at corner edges on each side of the curved seal surface, at least two of the cutouts being formed of a flat shoulder edge that extends in a direction of the body axis and that is tapered relative to the body axis and a flat shoulder edge extending transversely relative to the body axis, the flat shoulder edges intersecting at an obtuse internal angle, the seal body having a first modulus of elasticity;

first and second diametrically opposed axially outward anti-extrusion rings disposed in the cutouts and having a second modulus of elasticity, the second modulus of elasticity being higher than the first modulus of elasticity; and first and second coil springs disposed within the anti-extrusion rings.

5. The sealing assembly of claim 4, wherein the first and second anti-extrusion rings each include a groove formed therein, the first and second coil springs being disposed within the respective groove in the first and second anti-extrusion rings.

6. The sealing assembly of claim 5, wherein the depth of the groove is substantially the same as the diameter of the coil ring.

7. The sealing assembly of claim 4, wherein the curved seal surface is on the inner diameter of the seal body and protrudes inwardly to have an inner diameter smaller than an inner diameter of the anti-extrusion rings.

8. The sealing assembly of claim 4, wherein the curved seal surface is on the outer diameter of the seal body and protrudes outwardly to have an outer diameter greater than an outer diameter of the anti-extrusion rings.

9. The sealing assembly of claim 4, wherein the cutouts comprise shoulder edges that respectively taper outwardly toward outer edges of the seal body.

10. The sealing assembly of claim 4, wherein the cutouts comprise shoulder edges that taper inwardly toward an outer edge of the seal body.

11. The sealing assembly of claim 4, wherein the anti-extrusion rings are in the shape of a hollow frustum.

12. The sealing assembly of claim 11, wherein a bottom of the frustum is flush with a side edge of the seal body.

13. The sealing assembly of claim 11, wherein a top of the frustum abuts one of the shoulder edges of the cutout.

14. The sealing assembly of claim 13, wherein a taper of the frustum abuts the other of the shoulder edges of the cutout.

15. The sealing assembly of claim 4, wherein the seal body comprises an elastomeric material selected from the group consisting of hydrogenated nitrile butadiene rubber (HNBR), nitrile butadiene rubber (NBR), perfluoro-elastomers (FFKM), tetrafluoro ethylene/propylene copolymer rubbers (FEPM), fluoro-elastomers (FKM), neoprene and natural rubber.

16. The sealing assembly of claim 4, wherein the first and second diametrically opposed axially outward anti-extrusion rings comprise polytetrefluoroethylene (PTFE).

17. A sealing assembly for sealing a connector pin stabbed in a connector box, the sealing assembly comprising:

a generally D-shaped seal body arranged to be carried by one of the connector box and the connector pin, the seal body having an inner diameter and an outer diameter defining a body axis, one of the inner and the outer diameter having a curved seal surface when in a natural state and configured to interface with and seal against the other of the connector box and the connector pin, the seal body comprising a first cutout and a second cutout formed on opposing sides of the curved seal surface, each of the first and second cutouts being formed of a flat shoulder edge that extends in a direction of the body axis and a flat shoulder edge extending transversely relative to the body axis, the flat shoulder edges intersecting at an obtuse internal angle, the seal body having a first modulus of elasticity;

first and second anti-extrusion rings disposed respectively in the first and second cutouts, the first and second anti-extrusion rings having a second modulus of elasticity higher than the first modulus of elasticity, the first and second anti-extrusion rings each having a groove formed therein arranged to face toward the other of the connector box and the connector pin; and first and second coil springs respectively disposed within the first and second grooves, the first and second rings anti-extrusion rings.

18. The sealing assembly of claim 17, wherein the seal body comprises an elastomeric material selected from the group consisting of hydrogenated nitrile butadiene rubber (HNBR), nitrile butadiene rubber (NBR), perfluoro-elastomers (FFKM), tetrafluoro ethylene/propylene copolymer rubbers (FEPM), fluoro-elastomers (FKM), neoprene and natural rubber.

19. The sealing assembly of claim 17, wherein the first and second diametrically opposed axially outward anti-extrusion rings comprise polytetrefluoroethylene (PTFE).

20. The sealing assembly of claim 17, wherein the anti-extrusion rings are in the shape of a hollow frustum.

\* \* \* \* \*